United States Patent
Galep et al.

(10) Patent No.: US 10,853,839 B1
(45) Date of Patent: Dec. 1, 2020

(54) COLOR-BASED CONTENT DETERMINATION

(71) Applicant: Amazon Technologies, Inc., Reno, NV (US)

(72) Inventors: Jason Adrian Galep, Seattle, WA (US); Paul Anthony Kotas, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 251 days.

(21) Appl. No.: 15/343,944

(22) Filed: Nov. 4, 2016

(51) Int. Cl.
| | |
|---|---|
| *G06Q 30/00* | (2012.01) |
| *G06Q 30/02* | (2012.01) |
| *G06Q 30/06* | (2012.01) |
| *G06N 20/00* | (2019.01) |
| *H04L 29/08* | (2006.01) |
| *G06F 3/0482* | (2013.01) |
| *G06T 7/40* | (2017.01) |
| *G06T 11/00* | (2006.01) |

(52) U.S. Cl.
CPC ......... *G06Q 30/0244* (2013.01); *G06N 20/00* (2019.01); *G06Q 30/0643* (2013.01); *G06F 3/0482* (2013.01); *G06T 7/408* (2013.01); *G06T 11/001* (2013.01); *H04L 67/02* (2013.01); *H04L 67/20* (2013.01)

(58) Field of Classification Search
CPC .................................................... G06Q 30/00
See application file for complete search history.

(56) References Cited

U.S. PATENT DOCUMENTS

| | | | | |
|---|---|---|---|---|
| 7,249,035 | B2* | 7/2007 | Stinson | G06Q 10/087 |
| | | | | 705/26.1 |
| 8,880,424 | B1* | 11/2014 | Flint | G06Q 30/0277 |
| | | | | 345/668 |
| 9,189,811 | B1* | 11/2015 | Bhosle | G06Q 30/06 |
| 9,836,867 | B2* | 12/2017 | Bostick | G06T 11/00 |
| 2009/0028434 | A1* | 1/2009 | Vanhoucke | G06Q 30/02 |
| | | | | 382/182 |

(Continued)

OTHER PUBLICATIONS

Information on Eddie Bauer, May 23, 2010, archived web pages printed through www.archive.org. Date is in the URL in YYYYM-MDD format. (Year: 2010).*

(Continued)

*Primary Examiner* — Naresh Vig
(74) *Attorney, Agent, or Firm* — Hogan Lovells US LLP

(57) ABSTRACT

Supplemental content is selected or generated based at least in part upon colors of primary content with which the supplemental content is to be displayed. Color data is determined for primary content and that color data is used to select supplemental content that includes complementary or similar colors. Past performance data can be analyzed in order to determine which colors are most effective for a type of opportunity. When an opportunity arises to provide supplemental content, the effective colors can be recommended or, in some cases, automatically applied such that the supplemental content will include colors that improve the overall likelihood of performance of the supplemental content. If a designer is generating supplemental content, a tool can use such performance data to recommend colors based on the type of supplemental content or other such targeting criteria.

18 Claims, 9 Drawing Sheets

(56) References Cited

U.S. PATENT DOCUMENTS

| | | | | |
|---|---|---|---|---|
| 2009/0292605 A1* | 11/2009 | Kniaz | .................... | G06Q 30/00 |
| | | | | 705/14.25 |
| 2013/0347018 A1* | 12/2013 | Limp | ................. | H04N 21/4826 |
| | | | | 725/19 |
| 2014/0201028 A1* | 7/2014 | Bhardwaj | ......... | G06F 16/24578 |
| | | | | 705/26.7 |

OTHER PUBLICATIONS

Park et al., "The Role of Color in Content-Based Image Retrieval", 2000, IEEE (Year: 2000).*

* cited by examiner

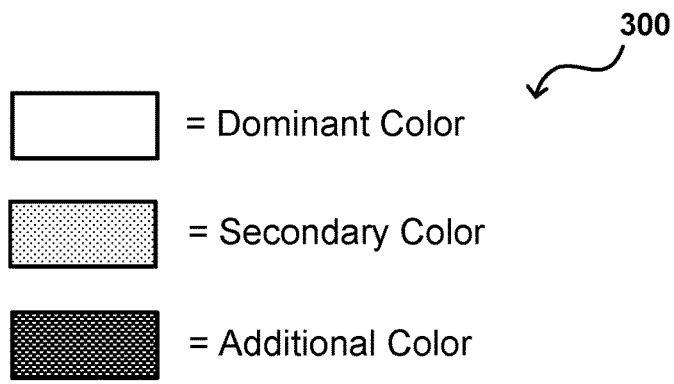
FIG. 3A
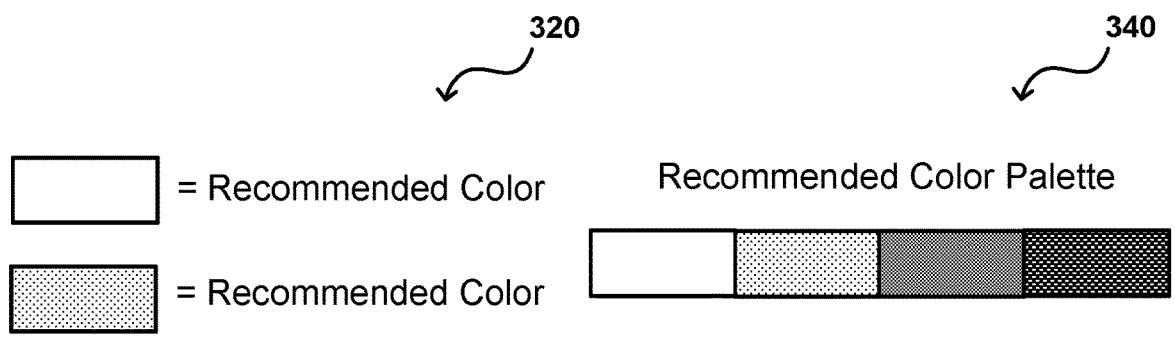
FIG. 3B
FIG. 3C
FIG. 3D

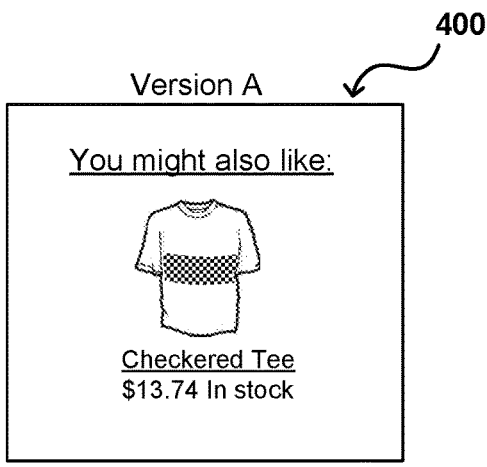
FIG. 4A
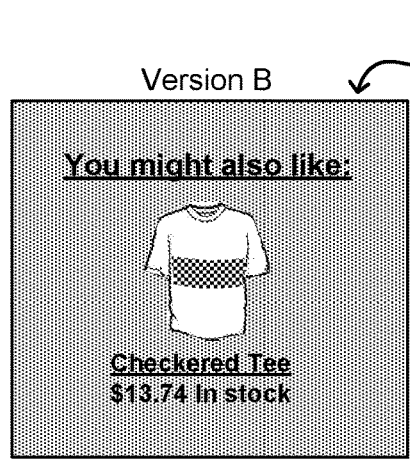
FIG. 4B
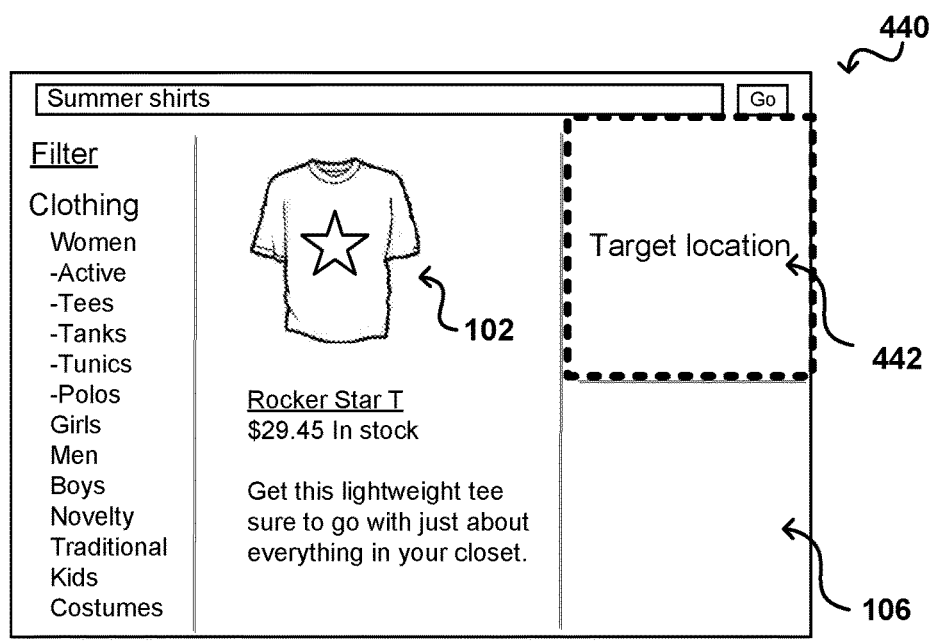
FIG. 4C
Projected performance:
Version A: 3.2%
Version B: 1.3%
FIG. 4D

COLOR-BASED CONTENT DETERMINATION

BACKGROUND

Users are increasingly consuming content electronically, such as by accessing digital content provided over the Internet or another such network. Providers of such content often will want to make the content appealing to the users in order to encourage the users to consume that content. This can include, for example, hiring graphic designers and design firms to generate content and content templates that are aesthetically pleasing to various users, or that catch the attention of those users. For content such as advertising and other supplemental content, however, the content will typically be displayed with various types or instances of primary content that are out of control of the designer. The colors, style, or other appearance characteristics of the primary content may vary from the characteristics of the supplemental content in a way that actually discourages users from, or at least reduces a likelihood of, viewing or consuming the supplemental content when the primary and supplemental content are displayed together.

BRIEF DESCRIPTION OF THE DRAWINGS

Various embodiments in accordance with the present disclosure will be described with reference to the drawings, in which:

FIGS. 3A, 3B, 3C, and 3D illustrate approaches to utilizing one or more identified colors to generate or modify supplemental content that can be utilized in accordance with various embodiments.

FIGS. 4A, 4B, 4C, and 4D illustrate an example approach to providing expected performance values for different versions of supplemental content are able to be displayed with primary content that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing content in an electronic environment. In particular, various embodiments enable supplemental content to be selected and/or generated based at least in part upon colors of the primary content with which the supplemental content to be displayed. In some embodiments, color data can be determined for primary content and that color data can be used to select supplemental content that includes complementary or similar colors. In other embodiments, past performance data can be analyzed in order to determine which colors are most effective for a given type of opportunity. When an opportunity arises to provide supplemental content with primary content, the effective colors can be recommended or, in some cases, automatically applied such that the supplemental content will include colors that will improve the overall likelihood of performance with respect to the supplemental content. If a designer is generating supplemental content, a design tool can use such performance data to recommend colors based on the type of supplemental content or other such targeting criteria.

Various other functions can be implemented within the various embodiments as well as discussed and suggested elsewhere herein.

Figure 1A:
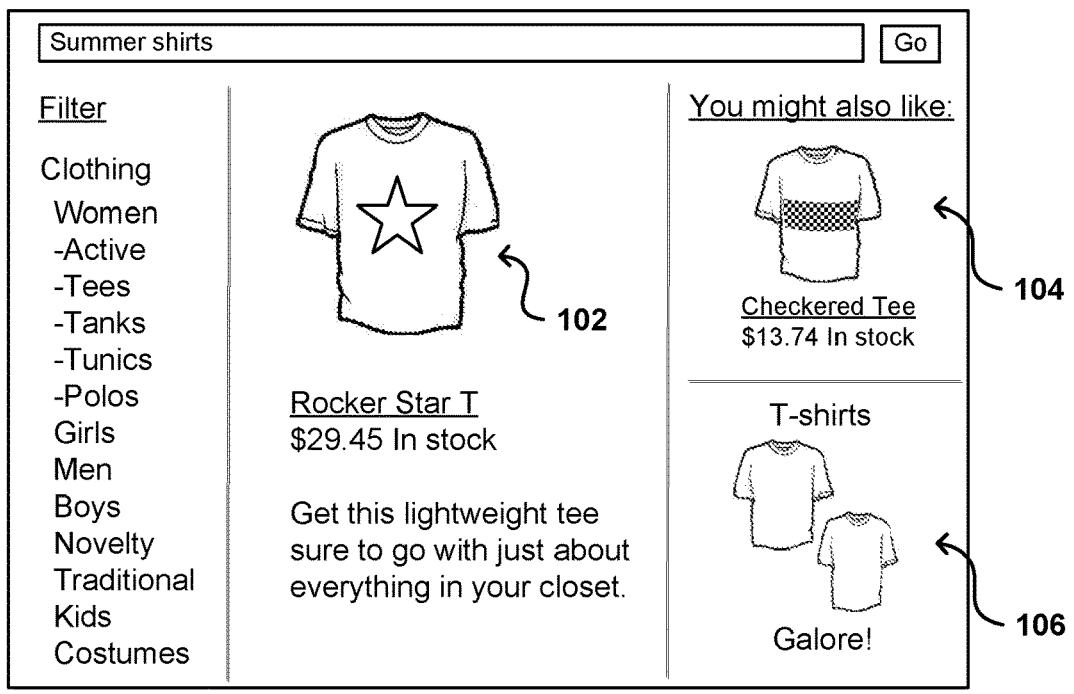
FIGS. 1A and 1B illustrate example displays of primary and supplemental content that can be presented in accordance with various embodiments.

FIG. 1A illustrates an example display 100 that can be generated using a display element, such as a display screen or projector, of an electronic device. In this example, the primary content 102 relates to an item offered for consumption through an electronic marketplace, although various other types of digital content can be presented as well within the scope of the various embodiments. Here, the primary content 102 includes at least one image showing a view of the item, as well as descriptive information such as pricing, sizing, and the like. Various other types of content may be displayed as well, such as portions of a user interface or navigational elements. The image of the item can include various colors that correspond to the item, such as a primary color for the material of the shirt and at least one additional color corresponding to the logo or design on the shirt. There can also be different colors represented in other regions or portions of the primary content, such as may relate to a background color, font color, border or interface element color or pattern, and the like.

As illustrated in FIG. 1A there can also be one or more instances of supplemental content 104, 106 displayed along with the primary content. The supplemental content here is shown to include advertising or promotional content related in some way to the primary content, but it should be understood that any appropriate supplemental content can be presented as well, as may be related, or unrelated, to the primary content. This can include, for example, descriptive content, related video content, image content, and the like. In some instances the content will be selected specifically to be displayed on this page of content including the primary content. In other instances the supplemental content may be selected dynamically in response to a request for the primary content. This might be the case when, for example, a user device has submitted a request for a page including the primary content and advertisers have submitted bids on keywords or other targeting criteria to be used to select appropriate supplemental content to be displayed with the primary content. In many instances the manufacturer of the item, the provider of the primary content, and the provider of the supplemental content will have little to no control over the appearance of the supplemental content that is selected for display.

Figure 1B:
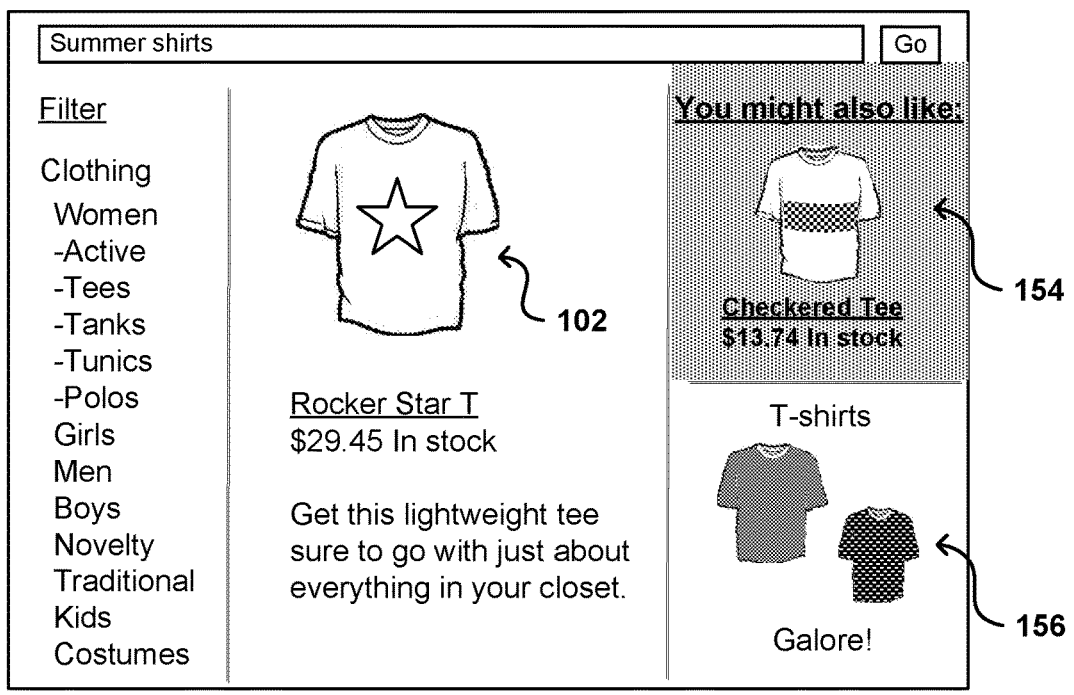

Accordingly, the supplemental content might have a complementary or contrasting appearance with respect to the primary content. For example, the supplemental content 104, 106 displayed in FIG. 1A has the same general color scheme or palette as the primary content, and thus appears rather harmonious with the primary content. This may provide for a pleasant user experience, at least from an aesthetic point of view. Alternatively, the supplemental content 154, 156 selected for the display 150 of content illustrated in FIG. 1B uses contrasting colors, which do not blend well with the colors of the primary content. This may not be aesthetically pleasing to the user, and may be less than desirable for the provider or designer of the page of primary content.

It therefore may be beneficial in at least some embodiments to attempt to match the colors of the supplemental content to those of the primary content. For situations where at least some motivation of a provider of the supplemental content is to prompt an action, such as a view, click, or purchase action, however, it might be the case that the harmonious supplemental content is more aesthetically pleasing but actually less likely to result in the corresponding action being taken. For those situations, the contrasting supplemental content 154, 156 may be more eye-catching and thus more likely to result in an action. The performance thus can depend at least in part upon the amount that the colors of the supplemental content match, complement, or contrast those of the primary content. The relative performance can also vary with other factors as well, such as specific color palettes, categories of content, or types of users, among other such options.

Accordingly, approaches in accordance with various embodiments attempt to determine one or more colors present in primary content and determine supplemental content based at least in part upon the one or more colors of the primary content. The determination can include selecting, generating, or modifying the supplemental content to have colors that are determined to correspond to the one or more colors of the primary content. These can include colors that are complementary, or colors that have been proven to provide optimal performance under the present conditions, among other such options. The determination can be performed dynamically, such as in response to a request for the primary content, or in an offline process, such as where a provider of the supplemental content generates the supplemental content using colors determined to be appropriate and/or optimal for the present conditions.

Figure 2A:
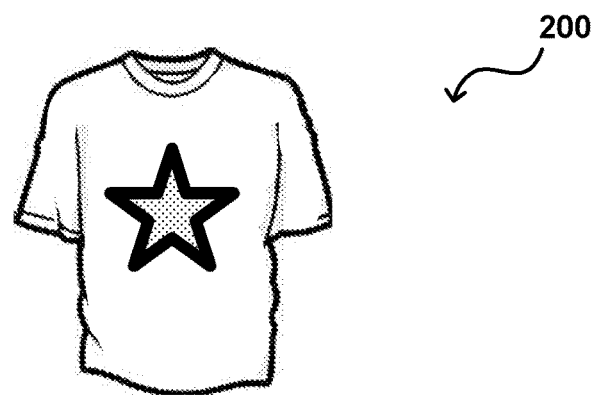
FIGS. 2A, 2B, and 2C illustrate an approach to determining one or more colors to be used in determining supplemental content for an instance of primary content that can be utilized in accordance with various embodiments.
Figure 2B:
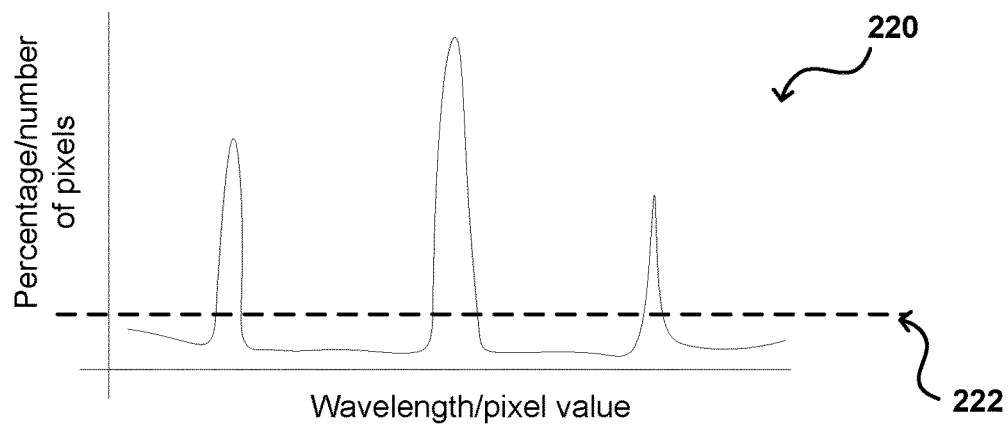
Figure 2C:
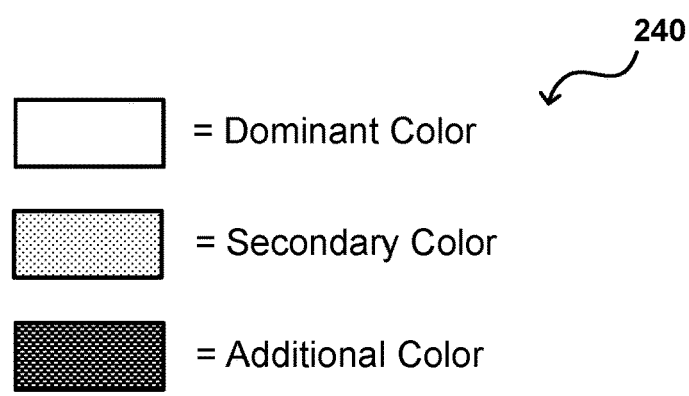

FIGS. 2A, 2B, and 2C illustrate one example approach to determining colors for primary content that can be utilized in accordance with various embodiments. In this example, an image 200 of an object of interest is selected as representative of the object and the colors of that object. As mentioned elsewhere herein, the content to be matched in some embodiments may relate only to an image of the object, while in other embodiments the colors may come from associated descriptive content, graphics, backgrounds, patterns, pages or windows, or other such groupings of content that may include, or relate to, the image 200. For some primary content there may not be an image, such that any or all of these other types of content may be considered for color determination purposes.

In this example approach the image 200 of the item illustrated in FIG. 2A is analyzed using any appropriate color analysis and/or determination process or procedure, as may include principal component analysis, spectral analysis, and the like. In this example, the pixel values for the image are analyzed to determine a distribution of color values. In some embodiments at least some amount of image pre-processing can be performed, such as to remove background pixels from consideration or to reduce a color depth of the image, among other such options. FIG. 2B illustrates a graph 220 of an example pixel value distribution that can be determined by analyzing the image 200 of FIG. 2A. Here, the number of pixels (or percentage of pixels) in the image that have each color value is plotted over the range of pixel values, such as may range from 0 to 512, among other such options. Various color components or other approaches can be used as well within the scope of the various embodiments. As illustrated, there will be ranges of values present for a given color, as may be due to variations in shading, lighting, angle, interpolation, or other such causes. Thus, one approach is to search for ranges of pixel values over which at least a minimum threshold 222 number of pixels has any of those color values. As illustrated in the example graph 220 of FIG. 2B, three peaks exceed the threshold and thus can be considered as relevant or dominant colors for the image. For each peak, a specific pixel value can be determined to be the dominant color. This can include, for example, the value for a middle, centroid, or average location of the value of the peak above the threshold, among other such options. The relevance or dominance of the color can be similarly determined, such as by analyzing the area under the peak but above the threshold, the height of the peak, the width of the peak, or another such value. Using the area under the curve can be beneficial for images where the dominant color might have significant lighting variations, resulting in a short, wide peak while a secondary color might have little variation and thus appear as a tall, thin peak. While the secondary color might appear higher in the graph, the total number of pixels corresponding to the dominant color, including lighting variations, can be much larger. A provider can also make a determination as to the approach to take, as in some instances a specific color without significant lighting variation may be preferred for specific instances. As discussed elsewhere herein, computer learning may also indicate that such colors have more impact upon performance, among other such aspects. In this example, the peaks are analyzed as discussed and then classified, ranked, or otherwise identified for color determination purposes. As illustrated in the example result 240 of FIG. 2C, the colors are classified into a dominant color, a secondary color, and an additional color, although various other classifications can be used as well within the scope of the various embodiments. In this example, the dominant color might correspond to the color of the shirt, the secondary color to the main color of the design or logo, and the additional color a border color for the logo. In determining complementary, contrasting, or other colors for the image, any or all of these colors can be provided as inputs for the determination.

FIGS. 3A through 3D illustrate an example approach for determining complementary (or other relevant) colors for an image that can be utilized in accordance with various embodiments. In FIG. 3A, a set of three input colors 300 is provided from analyzing the primary content, as discussed with respect to FIGS. 2A through 2C. Here, there is a dominant color, a secondary color, and an additional color. At least the dominant color can be used to determine one or more recommended colors 320 as illustrated in the example of FIG. 3B. In this example the colors may correspond directly to the determined colors, may be complementary colors as determined according to color theory, or may be colors that have been determined to perform well when displayed along with the input colors, among other such options. The recommended colors can be used to select from among available instances of content, or to dynamically create or modify instances of supplemental content to be displayed. In other embodiments the input colors might be analyzed to produce a recommended color palette 340 to be used to select or generate such supplemental content. The palette may be more useful for selecting from existing instances of supplemental content, as there can be more colors from which to choose, and the overall color spectrum of the available instances can be compared against the palette to determine which instance most correspond to the colors of the palette. A palette can also provide more flexibility for a designer or creator of the supplemental content than one or two recommended colors. In some embodiments the palette can be used to auto-fill colors for the supplemental content, such as to automatically select font, background, and other graphical element colors from the recommended palette. For example, an advertisement 360 can be generated as illustrated in FIG. 3D wherein the item, background, and/or font color can be selected based at least in part upon the recommended color palette.

Such an approach can enable a content provider to generate multiple versions of supplemental content, either offline or dynamically, in order to enable the supplemental content to advantageously match or correspond to the colors of the primary content with which the supplemental content is to be presented. For example, a provider might determine a set of ten basic palettes or colors that might be present in primary content, and can generate a version of the supplemental content that is appropriate for each. As mentioned elsewhere herein, the versions also can be selected based upon other factors as well, such as type or category of primary content, type of user, etc. When an opportunity arises to provide supplemental content, information about the color(s) of the primary content can be used, along with other information as appropriate, to select the optimal version for that particular opportunity. Similarly, if the provider system has the ability to generate the supplemental content dynamically for each opportunity, the provider system (or other system or service that can be from a third party) can determine the appropriate colors or palette to use for different portions of the supplemental content and cause those colors to be used to generate the version for presentation.

FIGS. 4A through 4D illustrate one example approach that can be used to select from various options or versions of supplemental content that can be utilized in accordance with various embodiments. In this example there are two versions of an instance of supplemental content, a first version 400 prepared using a first color palette as illustrated in FIG. 4A, and a second version 420 prepared using a second color palette as illustrated in FIG. 4B. In these versions the main image of the item remains unchanged, but colors used for the background and text differ according to the respective palettes. Various other variations can exist as well as discussed and suggested elsewhere herein. In this example an opportunity to provide supplemental content is presented, as illustrated in the example display 440 of FIG. 4C. In this example there is a target location 442 for the content on the page, where the page includes primary content relating to an item of interest.

Various criteria can be used to determine which of the versions 400, 420 would be better to provide for the opportunity. As a first criterion, an image 102 of the item of interest can be analyzed to determine one or more colors or a color palette as discussed elsewhere herein. Other criteria can be determined and/or analyzed as well, as may relate to the type of page, other colors used on the page, colors of other supplemental content for the page, a type of user, a type of action to be prompted, etc. The criteria or parameters to be evaluated can be determined, and in this example can be analyzed using a trained neural network, or other machine learning algorithm, to determine an expected performance value for each of the versions with respect to the opportunity. Various other algorithms or procedures for predicting or determining an expected performance can be used as well within the scope of the various embodiments. As illustrated in the example results 460 of FIG. 4D, information for the primary content, along with color values for the different supplemental content versions, can be analyzed using a trained machine learning model to produce an expected or projected performance value for each version. In this example, it is illustrated that the first version 400 of the supplemental content has a slightly higher projected performance based at least in part upon the colors of the version with respect to the opportunity. Accordingly, that version of the supplemental content can be selected for the opportunity. In situations where a provider will place bids for the opportunity, such as in the case of sponsored advertising, the supplemental content provider might decide to only place a bid for the first version with the higher projected performance, or might place bids for both versions but provide a higher bid amount for the first version. In some embodiments a supplemental content provider might provide multiple versions of an instance of supplemental content, or enable multiple versions to be created dynamically according to various color specifications, and can provide rules, formulas, or other mechanisms for determining the appropriate bid amount or selection criterion for each version under various different circumstances, such as for different categories of items, different types of actions, etc. In some embodiments a customer or advertiser might provide a pricing map that corresponds to a color map, such that the bid price can be determined for an ad based at least in part upon the determined primary color (or set of colors) for the primary content.

Figure 5A:
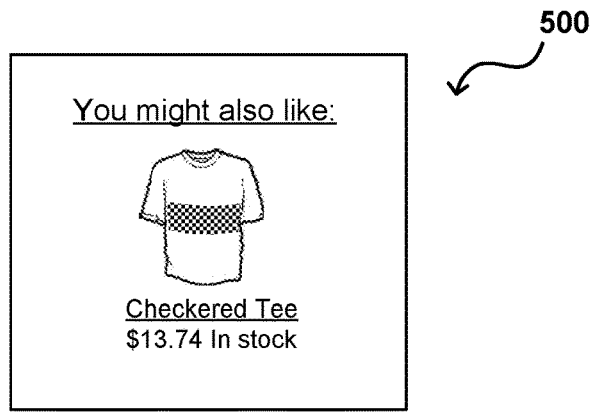
FIGS. 5A, 5B, and 5C illustrate a content generation tool that can suggest colors to be used for supplemental content that can be utilized in accordance with various embodiments.

The ability to determine expected performance for various colors or color combinations for an instance of supplemental content, or even primary content, can be used to help a designer or provider generate the instances of content as well. For example, consider an example instance of supplemental content 500 as illustrated in FIG. 5A. The content can relate to an item of interest, here a shirt offered for purchase. A designer can utilize a design tool to generate the instance, or versions of the interest, such as is illustrated by the example tool interface 520 of FIG. 5B. Here, the designer might insert an image of the item as well as text, pricing, or other descriptive text or graphical elements. As known for graphical design, the designer can have the ability to modify the color of elements such as the background, text, graphical elements, and the like. Based on information such as the color(s) of the item, as well as any other available information about the type of item, type of supplemental content, or potential opportunities in at least some embodiments, the tool can determine (or otherwise obtain) the expected performance for the supplemental content for each of a set of colors or color palettes. The performance values can then be used to recommend (or automatically set) colors to be used for one or more aspects or elements of the supplemental content.

Figure 5B:
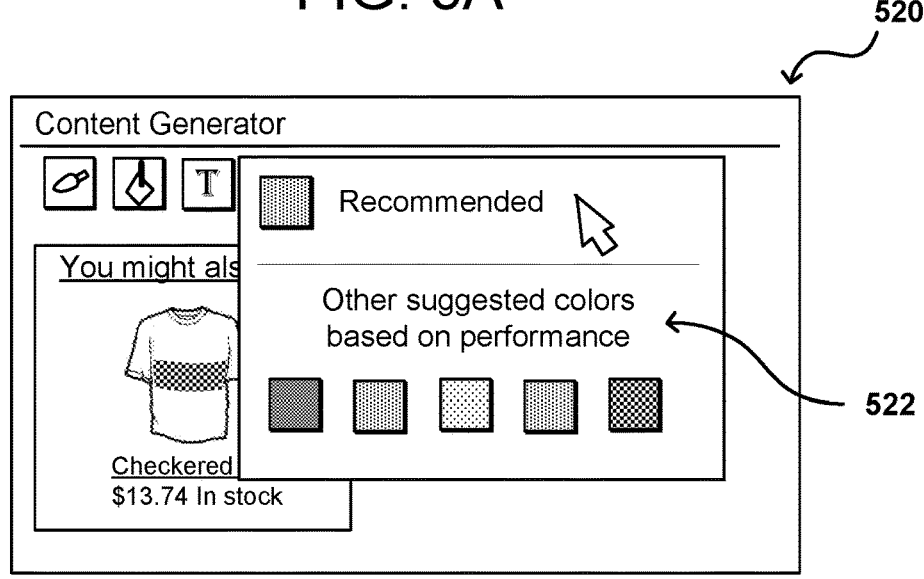
Figure 5C:
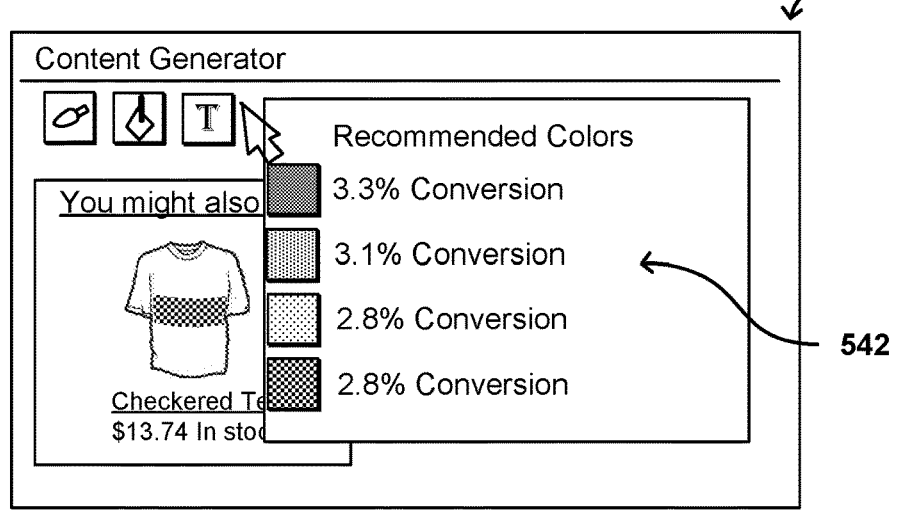

For example, in the display 520 of FIG. 5B one or more recommended colors are presented to the user for use in setting or adjusting a color of one of the elements. This might be an overall recommendation, or might be specific to an element selected by the user, such as the text or background of the instance. In this example there is a recommended color which can correspond to the color with the highest expected performance, or another such determined value that causes the color to be recommended above the other colors. Here, the tool also provides other colors that also have relatively high expected performance values, which helps to provide the designer with some flexibility in the aesthetics of the content. In some embodiments the suggested colors will all relate to a specific palette that has been determined to have the highest expected performance. Various other approaches can be used as well as discussed and suggested herein. In some instances, such as in the display 540 of FIG. 5C, the determined values 542 can be determined for each recommended color. This can enable the designer to have flexibility in design, but understand the impact of a change or selection in color. In this example, the designer can weigh the impact in performance against the selection of colors in order to design an instance that is aesthetically pleasing while still being at, or near, an optimal expected performance value.

As mentioned, various targeting criteria can be used to determine the colors or palettes that would be most beneficial to utilize for an instance of content. As mentioned, one such targeting criterion can include a color, set of colors, or palette used for the primary content. Other conventional targeting criteria can be used as well, as may include various keywords, categories of content, types of content, types of users, types of requests, types of opportunities, geographic location, or types of encouraged actions, among other such options. While complementary or harmonious colors might be utilized in some embodiments in order to provide an aesthetically pleasing experience, higher performing colors may be selected based on these or other targeting criteria in other embodiments. Some approaches might use a balance of the two, where versions with higher performing colors are selected but only up to a maximum contrast level or difference in palette, etc. In some embodiments the colors of the primary content can be specified in metadata for the content, while in other embodiments a near real-time analysis can be performed, which can also take into account various other content to be presented along with the primary content.

As mentioned, in at least some embodiments a recommendation model, neural network, or other such mechanism can be trained using various content data in order to be able to predict performance for various colors for a specific opportunity. This can include using a large training set including information about the colors for supplemental content provided for various opportunities and then looking at the relevant performance for the various combinations of colors and opportunity criteria. In other embodiments multiple versions of an instance of content can be tested for a type of opportunity to determine the relevant performance. Various other testing and training criteria can be used as well as known for training such models and networks. The networks once trained can provide values for distinct color inputs, can be used to recommend colors with specific values, or can provide ranges of values for ranges of colors, among other such options. In order to obtain a sufficient amount of data, the color depth used to train the model might be relatively low, such as 256 or 512 colors, which can then be extrapolated to a larger color palette. In some embodiments the input to the model might be the primary color, the colors present over at least a minimum portion of the image, a color palette, or a set of main colors with the relative percentages that each color, or range of colors, appears in the primary content.

In various embodiments reports or statistics can be generated for various providers, advertisers, or other such entities. This can include, for example, performance statistics for various versions of an ad or other instance of supplemental content. The statistics can be broken down by any appropriate category or criteria, such as type of opportunity, type of action taken, geographic location, etc. A provider can use this information to determine whether to modify or remove any of the versions from consideration, or whether to only use certain version for certain types of opportunities, among other such options. The reports can also include recommendations for other options or versions that are determined to provide similar or improved performance for various types of opportunities. In some embodiments the results can be more granular, as performance can be broken down not by type of instance but based on background color, font color, and the like.

When determining the colors for an instance of primary content, the information in some embodiments can be contained in the metadata as discussed previously. The entirety of the content can also be examined in some embodiments. In situations where it might be desirable to target a specific portion or type of primary content, certain regions of the primary content might be excluded from consideration. For example, if the targeting is to be based on the colors of an object of interest represented in an image, then it might be desirable in at least some embodiments to first remove from consideration any background color or font color present in the image. The background color if not removed might otherwise be determined to be the dominant color in the image. Thus, it can be desirable in at least some embodiments to isolate the item or element(s) of interest and then analyze only those portions of the content. In some embodiments the colors for the item of interest might be weighted more highly, but other colors present in the image or other portions of the primary content might still be considered but with lower relative weightings. In some embodiments a virtual screenshot can be created of the entire page or group of primary content for an opportunity and the entire screenshot analyzed for color information. In other embodiments specific portions of the page can be identified, such as may correspond to specific types of content or that might be within a percentage or other distance from the image of the item of interest, in order to determine the colors to target.

A provider or designer can also implement various rules or criteria that limit or control the combinations of colors that can be utilized for various instances of content. For example, the colors may have to be sufficiently different along the color spectrum. It would not be beneficial to use white lettering on a white background even if white is determined to be the highest performing color for each for a given opportunity. There may also be criteria on colors or palettes that can be used for these or other elements. For example, yellow lettering might not be used on a white background but might be permissible for other colors. Thus, in situations where the content is generated dynamically it can be important in at least some embodiments to provide rules or guidelines for the color selections and not rely solely on the expected performance values. In some embodiments there may be sets of permissible color combinations provided, and the set with the highest expected performance selected in order to ensure that the content is still aesthetically pleasing and able to perform its intended function. In other embodiments there might instead be blacklisted combinations, or blacklisted options such as to never use a light shade of any color for lettering against a light background, etc. Other rules can be implemented as well, such as to not cause all content on a page to use exactly the same colors, to use a variety of colors from a palette, etc. Rules can be provided from the customer, primary content provider, supplemental content provider, or any other appropriate source.

In some embodiments the creative elements of supplemental content may not be altered, but placement and/or selection optimized based at least in part upon the anticipated performance or complementary color state, among other such options. For example, a version or instance of supplemental content might be selected over another based upon the determined selection value(s). Similarly, in some embodiments complementary colored content may be placed closer to the primary content while contrasting content is placed further away, or in the reverse case if performance data so dictates. In some embodiments one or more elements of the primary content can be adapted based upon the available supplemental content, in order to provide for improve performance or complementary color values. Color targeting can also be a user-selectable option that can be turned off in at least some embodiments. In some embodiments a recommendation or notification can be provided to a provider when the provider uploads or otherwise provides supplemental content that is unlikely to perform well based at least in part upon its colors, such that the provider can determine whether or not to submit that content or to provide an alternative version. Similar to the recommended color options above, in some embodiments a tool or recommendation engine might also provide recommendations as to colors to avoid for a particular opportunity or type of instance.

Figure 6:
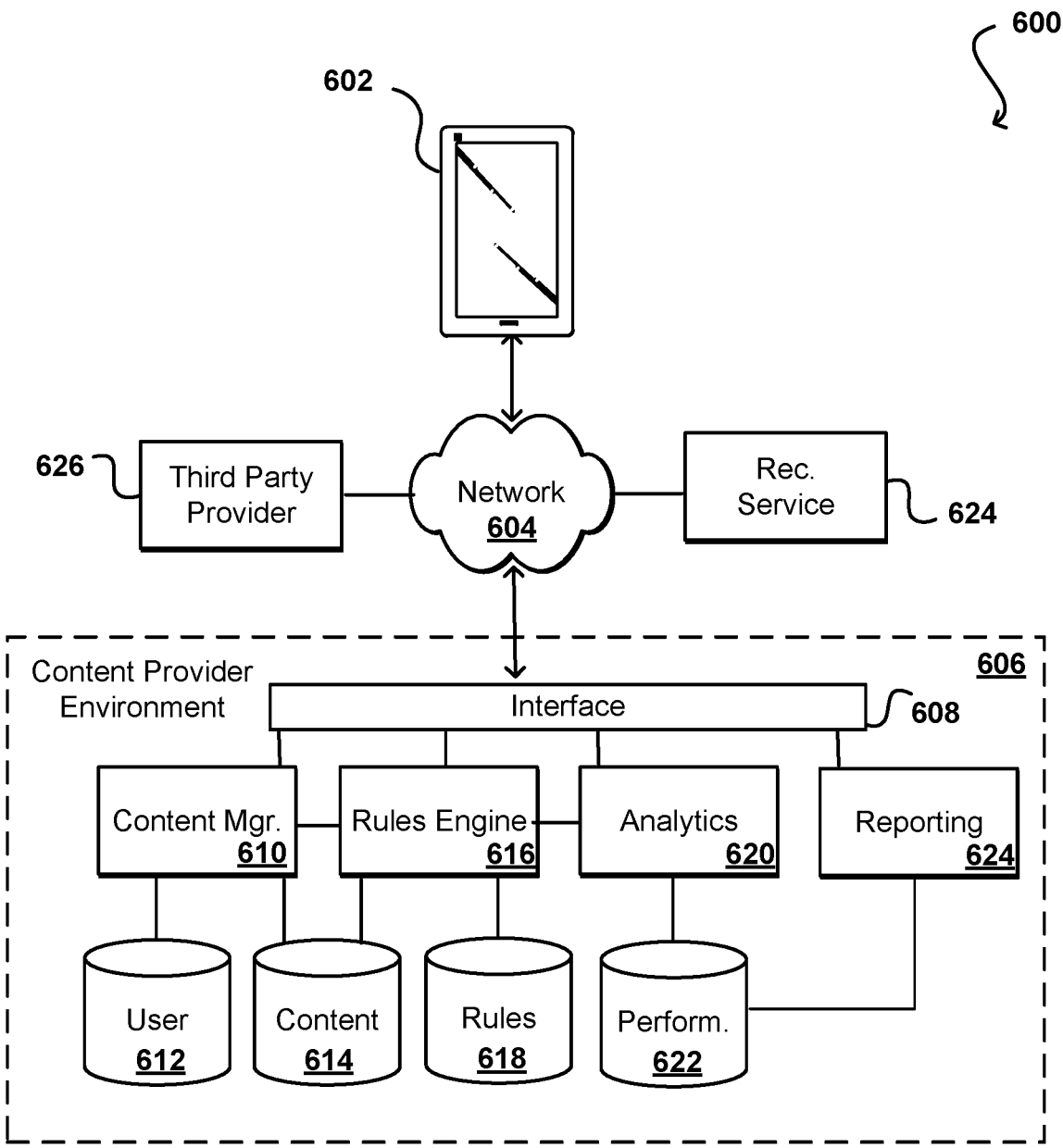
FIG. 6 illustrates an example system for determining supplemental content that can be utilized in accordance with various embodiments.

FIG. 6 illustrates an example environment 600 in which aspects of the various embodiments can be implemented. In this example, a computing device 602 is able to make a call or request across one or more networks 604 to a content provider environment 606. The network(s) can include any appropriate network, such as the Internet, a local area network (LAN), a cellular network, an Ethernet, or other such wired and/or wireless network. The content provider environment 606 can include any appropriate resources for providing content from a resource provider, as may include various servers, data stores, and other such components known or used for providing content from across a network (or from the "cloud").

In this example, a request received to the content provider environment 606 can be received by an interface layer 608 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 610 and/or content servers, which can obtain the content from a content data store 614 or other such repository to be sent back across the network(s) to the computing device. In some embodiments, information for the request might also be compared against user data in a user data store 612 or other such location do determine, for example, whether the user has access rights to that content. In some embodiments user data might also be analyzed to determine which type of content to provide, additional supplemental content to provide with the primary content, and the like.

In some embodiments the content to be provided can be a page or other grouping of content, which can include primary content and supplemental content. As mentioned, the primary content in at least some embodiments can relate to the main topic or location to which the user navigated, such as by entering a search query or navigating to a particular page via hyperlinks or other navigational elements. The primary content can come from the content data store 604 and the supplemental content can come from the content data store 614 and/or a third party content provider 626, among other such options. For example, if the supplemental content is advertising then a link might be provided to the client device 602 that can be used to obtain the advertising content from a third party source 626, which may be the same as, or different from, the advertising manager or service.

As mentioned, there can be multiple instances of supplemental content, or multiple versions of the same instance, that can be provided along with the primary content. In order to determine which supplemental content to select or recommend, the content manager 610 can work with a data analytics service 620 to utilize various trained models and/or past performance data to determine various values that can be used for the recommendations. Other types of opportunity-related data can be used to determine recommendation values as well, as may include related social media data, various opportunity-related metrics or calculations (as may be specific to a user, device, or location), predicted performance data, and the like. As an example, color information for the primary content can be provided to the data analytics service 620, which can utilize the color information and other information about the primary content to calculate values for the instances and/or versions of supplemental content that can be displayed with the primary content. In some embodiments the color information can be determined by the content manager, such as by analyzing the content or the associated metadata, or the primary content can be provided to the data analytics module for analysis. In some embodiments a virtual snapshot can be generated which can then be analyzed as discussed elsewhere herein.

In this example, the data analytics service 620 can utilize one or more trained neural networks in order to determine the expected performance value for each instance or version of supplemental content for the opportunity. As mentioned, the neural network can have been trained using past performance data (from a performance data repository 622) that includes color information for both primary and supplemental content displayed for various opportunities. In addition to color, the trained networks or models can also consider other targeting criteria as well, such as the type of opportunity, type of primary content, type of user, and the like. The data analytics service 620 can use the trained models or networks, or other appropriate determination algorithms or processes, to calculate the expected performance value for each instance or version, or at least a subset of the possible instances or versions. As mentioned, in some embodiments expected performance will not be the value used for the selection or recommendation, as other values such as color relatedness or palette similarity can be used as well, among other options discussed and suggested herein.

The data analytics service can then provide the values and/or a ranking of supplemental content that can be used to select the supplemental content to be displayed with the primary content. In other embodiments the data analytics service might instead provide recommendations as to colors or palettes with corresponding performance values, and these values can be used to select from the various supplemental content instances or potentially dynamically generate or update an instance of content, among other such options. In this example the content manager will work with a rules engine 616 to determine how to process the performance values and select the appropriate supplemental content. As mentioned, there can be various rules specified by any of a number of different entities, such as a primary content provider, supplemental content provider, customer, third party provider, and the like. These can include, for example, limitations on the types of colors that can be selected for a certain opportunity, limitations or rules for selecting specific colors, and guidelines for balancing performance and aesthetics, among others. The rules engine 616 can examine any applicable rules, as may be pulled from a rules repository 618, to ensure that any applicable rules are followed when selecting or generating the supplemental content for the opportunity. In at least some embodiments, the content manager 610 will select the instance or version of supplemental content that has the highest expected performance score and also satisfies all applicable rules for the selection. Other selection rules may apply as well, such as to select the option with the colors that match the most while maintaining a minimum level of performance or only decreasing by up to a maximum amount from the highest level of performance. The content manager 610 can then cause the primary and supplemental content to be provided for presentation via the client device 602. In should be noted that in some embodiments the data analytics, rules, and/or recommendation processes can be performed by a third party system or service 624 that can receive the targeting data from the content manager 610 and provide one or more recommendations relating to criteria for selecting or generating supplemental content, among other such options. As mentioned elsewhere herein, a reporting module 624 or other such system or service can also obtain and provide performance and other reporting data to customers or other appropriate entities at regular intervals or at other appropriate times. The reporting module 624 can also potentially provide recommendations, and in some embodiments can provide the performance data used for plug-ins to image editors or other such applications.

Figure 7:
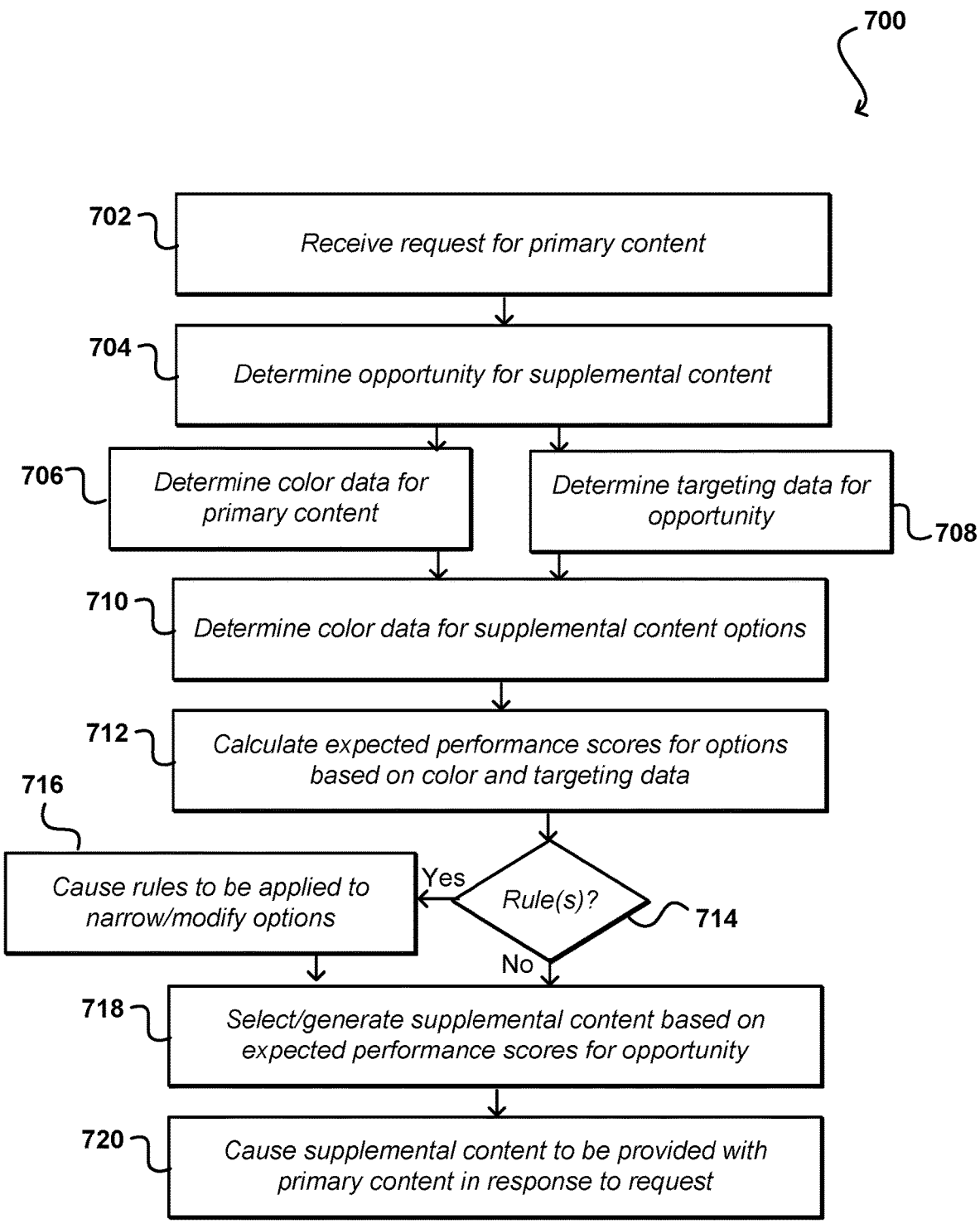
FIG. 7 illustrates an example process for determining supplemental content to display with primary content that can be utilized in accordance with various embodiments.

FIG. 7 illustrates an example process 700 for selecting supplemental content based at least in part upon color criteria that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a request for primary content is received 702, such as may correspond to a request for web content received to a web provider. In the process of responding to the request, at least one opportunity to provide supplemental content can be determined 704. This can include, for example, determining that a web page including the primary content has one or more regions designated for supplemental content, as may relate to advertising slots or other such regions. In some embodiments the number of opportunities can be based at least in part upon the type of primary content, the available supplemental content, the amount of compensation provided for the supplemental content, and other such options.

In order to determine which supplemental content to provide for the opportunity, various data can be determined or collected. For example, color data for the primary content can be determined 706. As mentioned, this can include any of a variety of different determinations, such as determining a primary color, a set of colors, or a color palette for the primary content, which can include color data for only an image of the primary content, all or part of the primary content, or additional elements of the page including the primary content, etc. Additionally, in at least some embodiments additional targeting data can be determined 708 for the opportunity. The targeting data can include data such as, for example, keywords used to identify the primary content, category information for the primary content, identifying information for the user, historical action data for the user, geographical information, and the like. Various other types of targeting data can be used as well as known or used for determining supplemental content. Based at least in part upon the targeting data, a set of supplemental content options can be determined. These can be options that relate in some way to the primary content, or have otherwise been identified using the target data. Color data for the supplemental content options can then also be determined 710, whether by processing the options or viewing metadata for the options, etc. An expected performance score can then be calculated 712 for at least some of the supplemental content options, based at least in part upon the color data for the supplemental content options and the primary content. As mentioned, in some embodiments a goal will be to select supplemental content having colors that match or complement those of the primary content, such that the performance values can relate to the complementary nature of the supplemental content. In other embodiments the targeting data and color data for the primary content can be used along with the color data for the supplemental content options to calculate an expected performance score based on past performance data. In some instances this can involve using a model or neural network trained using the past performance data to determine an expected performance value for a supplemental content option taking the color data into consideration.

In at least some embodiments the expected performance scores can be used to compare or rank the various supplemental content options. It may be the case, however, that various rules, policies, or other guidelines are in place that limit or dictate various colors, combinations, or other aspects that are permissible for the supplemental content. Accordingly, a determination can be made 714 as to whether there are any rules that are applicable to the current opportunity. These can include, for example, rules set forth by a provider of the primary content, a provider of the supplemental content, a source of the request, and/or another such entity. As discussed herein, rules can indicate aspects such as colors that are not to be used together, or for certain elements, permissible combinations, minimum or maximum similarity thresholds, palette restrictions, and the like. Rules may be applied at any appropriate level, such as globally (i.e., never have the foreground and background colors the same), at a per-content basis, at a per-opportunity basis, for a type of user or in a specific geographical region, etc. If any applicable rules are determined, then the rules can be caused 716 to be applied to select, narrow, or modify the options for supplemental content. This can include, for example, a rules engine determining any options to be excluded from consideration or re-ranking the supplemental content according to the rules, among other such options. Once the rules have been applied and supplemental content options scored and/or ranked, the supplemental content to display can be selected, generated, or otherwise chosen 718 based at least in part upon the scores or rankings for the opportunity. As mentioned, the selected content may not have the highest performance score but might balance performance score with color similarity or other criteria. In other embodiments the selected content might be the option with the colors most similar to those of the primary content. Various other selection criteria can be used as well within the scope of the various embodiments. Once the supplemental content is selected, the supplemental content can be caused 720 to be provided along with the primary content (together or separately) in response to the request. As mentioned, the supplemental content may be provided from the same or a different source, and in some instances a link or address can be sent from which the client device can obtain the supplemental content, such as in the case of advertising or promotional content.

Figure 8:
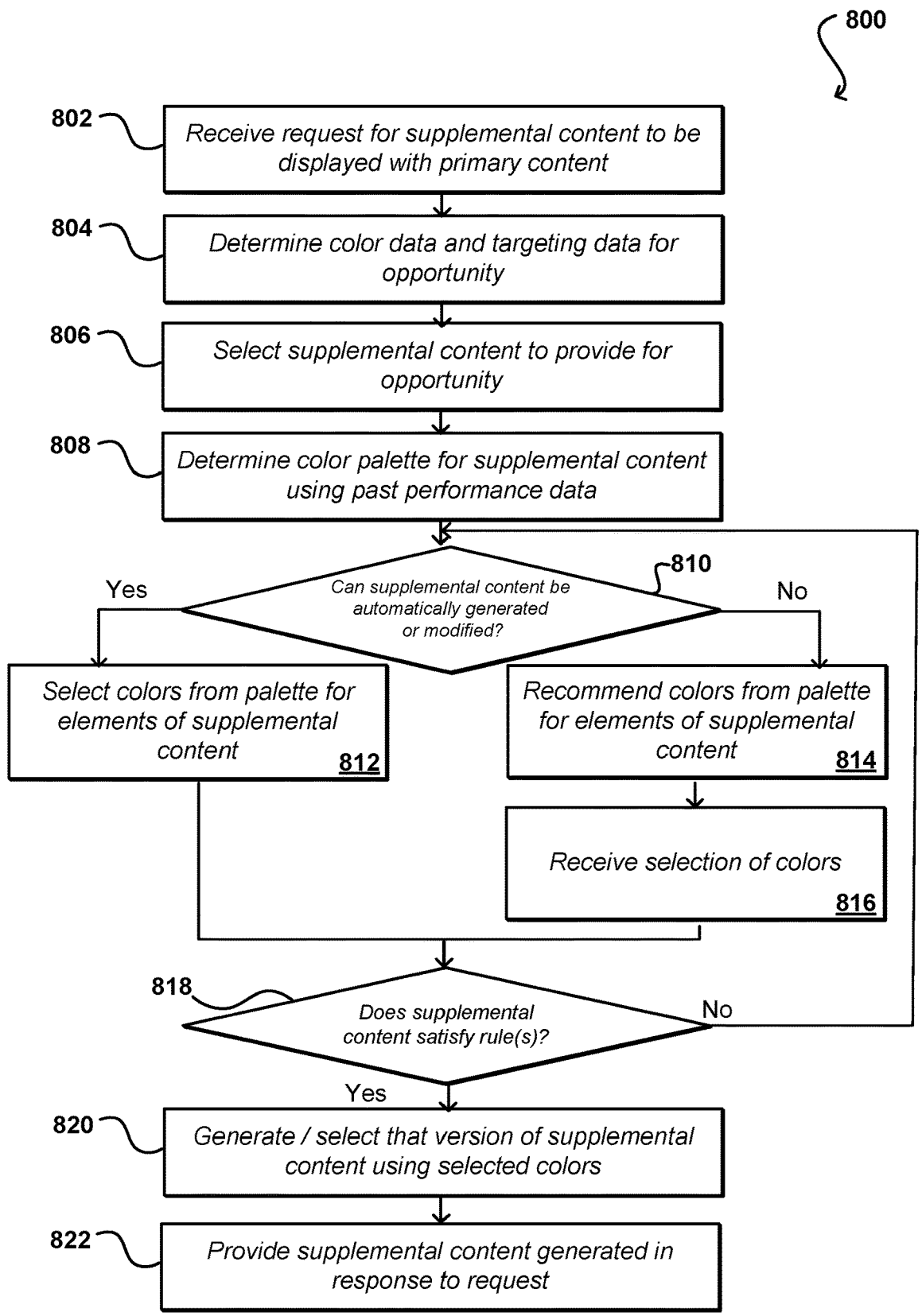
FIG. 8 illustrates an example process for generating supplemental content to display with primary content that can be utilized in accordance with various embodiments.

FIG. 8 illustrates an example process for selecting a version of supplemental content to be displayed that can be utilized in accordance with various embodiments. In this example, a request is received 802 for supplemental content to be displayed with primary content. This can include, for example, content to be displayed on a webpage, in an application, or with media content, among other such options. Color and targeting data for the opportunity can be determined 804. As discussed, the targeting data can include information such as keywords, primary content category, content type, user type, geographic location, and the like. At least the targeting data can be used to select 806 supplemental content to be provided for the opportunity. As known for such purposes, the supplemental content can be selected based on a similarity or relevance score with respect to the primary content as determined using the targeting data, and potentially the color data.

In this example, a color palette can be determined 808 based at least in part upon past performance data. This can include, for example, analyzing the targeting and color data using a trained model or neural network to determine the color, colors, or color palette that is most likely to provide a desired outcome, such as a targeted action or aesthetic complement, among other such options. A determination can be made 810 as to whether the supplemental content can be dynamically or automatically generated or modified. If so, colors from the palette can be selected 812 for elements of the supplemental content, and the instance of content can be generated using colors from the palette that are determined to be effective with respect to the primary content. As mentioned this can include setting colors of elements such as the background, text content, graphical elements, and the like. Further as discussed, the content can be generated server-side and then delivered to the client, or can be generated on the client using, for example, JavaScript executing in a browser application, among other such options. If versions of the supplemental content already exist, then the color palette can be used to enable a dynamic selection of the version to provide based upon a similarity to the color palette. If the changes cannot be automatically made, or colors set, then colors from the palette can be recommended 814 for use in selecting or generating the supplemental content. If a designer is generating the supplemental content then the designer can choose which colors from the palette to use for various elements of the content, or can choose to use different colors. If there are already existing versions of the supplemental content, then the recommendations can be used to enable selection of an appropriate version of the supplemental content. The selection of colors, or selection of one of the versions of the supplemental content, can then be received 816 such that a version of the supplemental content to provide is available.

A determination can be made 818 as to whether the generated content satisfies any applicable rules for the opportunity. As mentioned, there may be rules restricting which colors can be used together, which colors can be used for various elements, a maximum or minimum level of similarity, or other such aspects. If one or more applicable rules are not satisfied, then changes can be automatically made (if permissible) or alternative recommendations provided in order to obtain content that satisfies the rules. In some embodiments the rules may be evaluated for each attempted change such that no change or selection can be made that violates an applicable rule. There may also be various policies that are to be enforced, as may relate to avoiding issues with colorblind users or users with various other sensitivities, geographical restrictions to color combinations, and the like. Once a version of the supplemental content has been determined that satisfies all applicable rules, the version of the supplemental content can be generated 820, selected, or otherwise obtained, and can then be provided 822 in response to the request.

Figure 9:
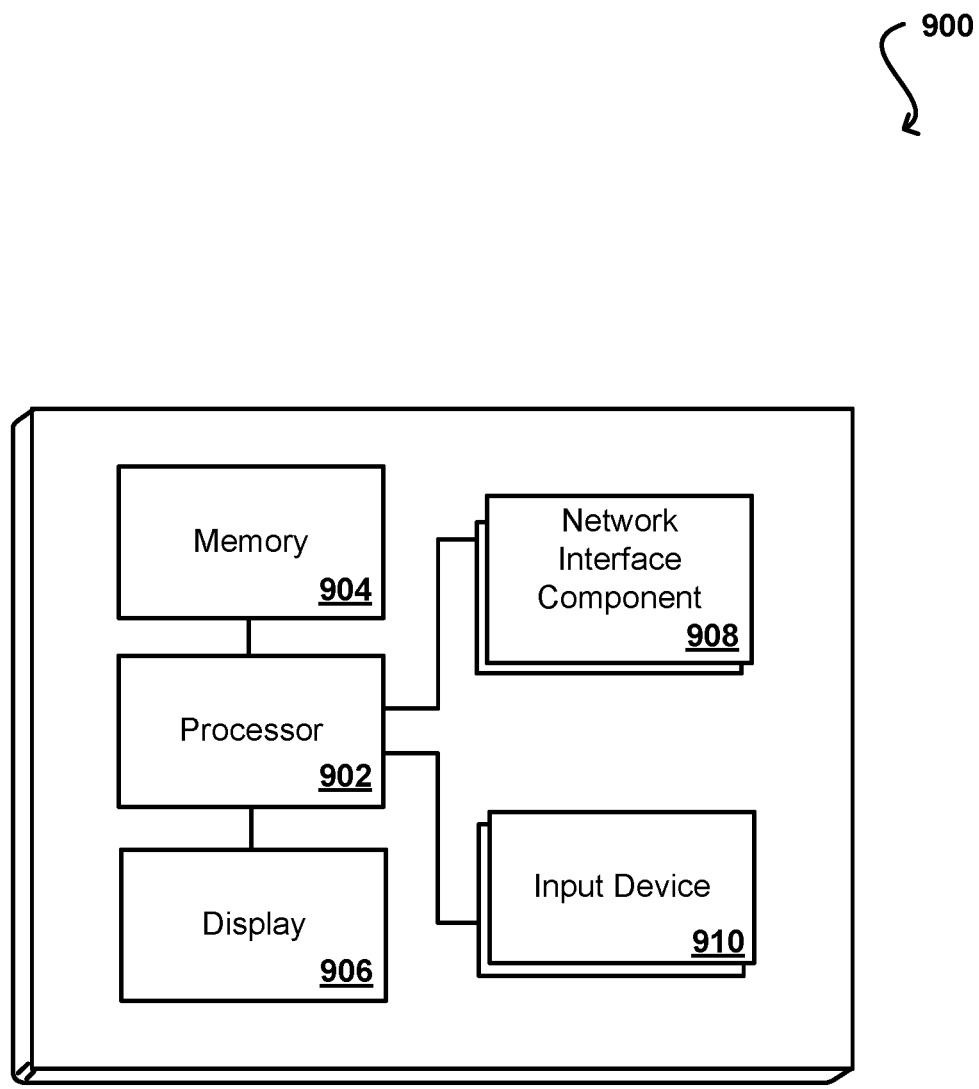
FIG. 9 illustrates example components of a computing device that can be utilized in accordance with various embodiments.

FIG. 9 illustrates a logical arrangement of a set of general components of an example computing device 900 that can be used to implement aspects of the various embodiments. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from a client device, a request for primary content, the request associated with one or more targeting criteria, the one or more targeting criteria including at least one of a keyword, a category, a type of primary content, a user identifier, a type of supplemental content, or a geographic location;
determining a first set of colors visible in the primary content when displayed by the client device;
determining, based at least in part upon the one or more targeting criteria, an opportunity to display supplemental content and the primary content on the client device;
determining, based at least in part upon historical performance data and the first set of colors, a second set of colors determined to increase a likelihood of a specified user action being taken with respect to the supplemental content if displayed with the primary content, the second set of colors determined based at least in part on at least one of a performance score or a similarity, a complement, or a contrast with respect to the first set of colors visible in the primary content;
verifying that a particular instance complies with one or more rules applicable to the opportunity;
generating the particular instance of the supplemental content for the opportunity, wherein the particular instance includes one or more graphical elements having at least one color selected from the second set of colors; and
providing, in response to the request, the particular instance of the supplemental content for display with the primary content on the client device.

2. The computer-implemented method of claim 1, further comprising:
generating a plurality of instances of the supplemental content for the opportunity, wherein the plurality of instances comprises the particular instance;
determining, for each instance of the plurality of instances of the supplemental content, one or more colors present in the instance; and
selecting the particular instance from the plurality of instances, wherein the selection of the particular instance is based at least in part on a color similarity of the one or more colors in the particular instance and the second set of colors.

3. The computer-implemented method of claim 1, further comprising:
selecting content to be included in the particular instance of the supplemental content, the content including the one or more graphical elements; and
dynamically causing the one or more graphical elements to have colors selected from the second set of colors.

4. The computer-implemented method of claim 1, further comprising:
generating a plurality of instances of the supplemental content for the opportunity, wherein the plurality of instances comprises the particular instance;
recommending one or more of the instances of the supplemental content, from the plurality of instances of the supplemental content, for the opportunity based at least in part upon the one or more instances having colors similar to the second set of colors; and
receiving a selection of the particular instance from the one or more recommended instances.

5. The computer-implemented method of claim 4, further comprising:
displaying, for each instance of the one or more instances of the supplemental content being recommended, a respective performance score generated for the instance with respect to the opportunity.

6. A computer-implemented method, comprising:
determining an opportunity to provide supplemental content for display, on an electronic device, with primary content, the opportunity determined based at least in part on a request, from the electronic device, for the primary content and one or more targeting criteria for the opportunity, the one or more targeting criteria including at least one of a keyword, a category, a type of primary content, a user identifier, a type of supplemental content, or a geographic location;
determining, using at least one processor of a computer system, at least one first color of the primary content;
determining opportunity-related data corresponding to the opportunity;
generating a representation of the primary content and a particular instance of the supplemental content, the particular instance of the supplemental content including at least one second color, the at least one second color being determined, using the at least one processor of the computer system, based at least in part upon the at least one first color of the primary content and the opportunity-related data, and the at least one second color based at least in part on at least one of a performance score or a similarity, a complement, or a contrast with respect to the at least one first color of the primary content; and providing the representation of the primary content and the particular instance of the supplemental content for display on the electronic device.

7. The computer-implemented method of claim 6, further comprising:
selecting the primary content based at least in part upon the one or more targeting criteria; and
determining the opportunity to provide the supplemental content for display based at least in part upon the one or more targeting criteria.

8. The computer-implemented method of claim 6, further comprising:
determining the at least one first color of the primary content by obtaining metadata for the primary content or performing a color analysis on at least one graphical element associated with the primary content.

9. The computer-implemented method of claim 6, wherein the opportunity-related data includes at least one of historical performance data, opportunity metric data, or associated opportunity content.

10. The computer-implemented method of claim 9, further comprising:
training at least one of a machine learning model or a neural network using the historical performance data; and
calculating the performance score using the at least one of the machine learning model or the neural network.

11. The computer-implemented method of claim 6, further comprising:
generating a plurality of instances of the supplemental content qualifying for the opportunity;
determining, for each instance of the plurality of instances, one or more colors present in the instance when displayed; and
selecting the particular instance of the supplemental content from the plurality of instances, wherein the selection of the particular instance is based at least in part on a similarity of at least one of the one or more colors in the particular instance and the at least one second color.

12. The computer-implemented method of claim 6, further comprising:
generating a plurality of instances of the supplemental content qualifying for the opportunity;
recommending one or more instances of the plurality of instances of the supplemental content for the opportunity based at least in part upon the one or more instances having colors similar to the at least one second color; and
receiving a selection of the particular instance from the one or more instances.

13. The computer-implemented method of claim 12, further comprising:
displaying, for each instance of the one or more instances of the supplemental content being recommended, a respective performance score generated for the instance with respect to the opportunity.

14. The computer-implemented method of claim 6, further comprising:
verifying that the particular instance of the supplemental content complies with one or more rules applicable for the opportunity before providing the particular instance of the supplemental content for display on the electronic device.

15. The computer-implemented method of claim 6, wherein the particular instance of the supplemental content is generated such that at least one element of the particular instance includes the at least one second color, the at least one element including at least one of an image, text, a background, a video, an animation, a border, or a graphical element.

16. A system, comprising:
at least one processor; and
memory storing instructions that, when executed by the at least one processor, cause the system to:
determine an opportunity to provide supplemental content for display, on an electronic device, with primary content, the opportunity determined based at least in part on a request, from the electronic device, for the primary content and one or more targeting criteria for the opportunity, the one or more targeting criteria including at least one of a keyword, a category, a type of primary content, a user identifier, a type of supplemental content, or a geographic location;
determine, using at least one processor of a computer system, at least one first color of the primary content;
generate a representation of the primary content and a particular instance of the supplemental content, the particular instance of the supplemental content including at least one second color, the at least one second color being determined, using the at least one processor of the computer system, based at least in part upon the at least one first color of the primary content and performance data relating to the opportunity, and the at least one second color based at least in part on at least one of a performance score or a similarity, a complement, or a contrast with respect to the at least one first color of the primary content; and
provide the representation of the primary content and the particular instance of the supplemental content for display on the electronic device.

17. The system of claim 16, wherein the instructions when executed further cause the system to:
select the primary content based at least in part upon the one or more targeting criteria; and
determine the opportunity to provide the supplemental content for display based at least in part upon the one or more targeting criteria.

18. The system of claim 16, wherein the instructions when executed further cause the system to:
determine the at least one first color of the primary content by obtaining metadata of the primary content or performing a color analysis on at least one graphical element associated with the primary content.

* * * * *